United States Patent [19]
Robeson et al.

[11] 4,369,136
[45] Jan. 18, 1983

[54] POLY(ARYL ETHER) CONTAINING BLENDS

[75] Inventors: Lloyd M. Robeson; William D. Claus, Jr., both of Whitehouse Station; Harvey L. Batleman, Bridgewater, all of N.J.

[73] Assignee: Union Carbide Corporation, Danbury, Conn.

[21] Appl. No.: 135,761

[22] Filed: Mar. 31, 1980

[51] Int. Cl.³ .................. C08L 51/04; C08L 67/02
[52] U.S. Cl. .................................. 524/371; 525/67; 525/68; 525/439; 525/466; 525/468; 525/906; 524/456; 524/537
[58] Field of Search ............... 525/67, 68, 439, 906, 525/466, 468; 260/37 PC, 45.7 P, 45.95 G

[56] References Cited

U.S. PATENT DOCUMENTS

| | | | |
|---|---|---|---|
| 3,365,517 | 1/1968 | Barth | 525/906 |
| 3,646,162 | 2/1972 | Lauchlan | 525/906 |
| 3,649,712 | 3/1972 | Grabowski | 525/68 |
| 3,742,087 | 6/1973 | Nield | 260/40 R |
| 3,819,759 | 6/1974 | Weaver et al. | 525/439 |
| 4,013,613 | 3/1977 | Abolins et al. | 260/40 R |
| 4,259,458 | 3/1981 | Robeson | 525/68 |

Primary Examiner—J. Ziegler
Attorney, Agent, or Firm—Donald M. Papuga

[57] ABSTRACT

Described herein are molding compositions comprising a blend of a poly(aryl ether), a polyester and a compatibilizing amount of an aromatic polycarbonate. These compositions are especially suited for molding articles useful in electrical applications.

28 Claims, No Drawings

POLY(ARYL ETHER) CONTAINING BLENDS

BACKGROUND OF THE INVENTION

This invention is directed to a molding composition comprising a blend of a poly(aryl ether), a polyester and a compatibilizing amount of an aromatic polycarbonate. The composition can additionally contain one or more of the following: fiber reinforcement, inorganic particulate filler, impact modifier, or a flame retardant additive.

Filled polyester compositions, particularly fiberglass filled poly(butylene terephthalate) are widely used to mold electrical parts, such as connectors, since such parts have excellent chemical resistance and a high heat distortion temperature. However, the parts molded from a fiberglass filled poly(butylene terephthalate) composition have a tendency to warp to a high degree due to the uneven shrinkage resulting from crystallization of the poly(butylene terephthalate) during molding.

A molded article produced from a composition containing a poly(aryl ether), particularly polysulfone, fiberglass, and poly(butylene terephthalate) exhibit lower warpage than an article molded from a fiberglass filled poly(butylene terephthalate) composition. However, in several applications, an article molded from a composition of polysulfone, fiberglass, and poly(butylene terephthalate) tended to be brittle. Also, the polysulfone, fiberglass and poly(butylene terephthalate) are relatively incompatible and thus difficult to process into uniform articles.

A molded article produced from a composition containing a poly(aryl ether), particularly, polysulfone, and a polyester, particularly poly(ethylene terephthalate) or poly(butylene terephthalate), without fiberglass has improved chemical and environmental stress crack resistance. However, the components of this composition are also relatively incompatible and thus difficult to process into useful molded articles.

Thus, since compositions containing poly(aryl ether) and polyester have improved properties, a need exists to compatibilize them so that they can easily be processed into molded articles.

THE INVENTION

It has now been found that when an aromatic polycarbonate is added to a composition containing a poly(aryl ether) and a polyester, the resulting composition has improved compatibility and therefore can be easily processed into molded articles. It has also been found that a particular class of impact modifiers which are not effective with a composition containing a poly(aryl ether) and a polyester can be made effective when an aromatic polycarbonate is added to the composition.

Additionally, it has been found that when an aromatic polycarbonate is added to a composition containing a poly(aryl ether), a polyester and fiber reinforcement, an article molded from such a composition has reduced warpage as compared to an article molded from a composition containing fiber reinforcement and poly(butylene terephthalate) or poly(ethylene terephthalate). Thus, the compositions of this invention are especially suitable for molding into articles for electrical applications, such as electrical connectors. Further when a flame retardant is added to a composition containing a poly(aryl ether), a polyester, an aromatic polycarbonate, fiber reinforcement and optionally an impact modifier, an article molded from such a composition has an excellent balance of properties which are especially suited for molding articles for electrical applications.

The composition of this invention comprises a blend of:
  (a) a poly(aryl ether),
  (b) a polyester,
  (c) a compatibilizing amount of an aromatic polycarbonate, and optionally one or more of the following:
  (d) an impact modifier,
  (e) fiber reinforcement,
  (f) an inorganic particulate filler, or
  (g) a flame retardant additive.

The poly(aryl ether) resin may be described as a linear, thermoplastic polyarylene polyether wherein the arylene units are interspersed with ether, sulfone or ketone linkages. These resins may be obtained by reaction of an alkali metal double salt of a dihydric phenol and a dihalobenzenoid or dinitrobenzenoid compound, either or both of which contain a sulfone or a ketone linkage, i.e., —SO$_2$— or —CO—, between arylene groupings, to provide sulfone or ketone units in the polymer chain in addition to arylene units and ether units. The polymer has a basic structure comprising recurring units of the formula $$O-E-O-E'-$$

wherein E is the residuum of the dihydric phenol and E' is the residuum of the benzenoid compound having an inert electron withdrawing group in at least one of the positions ortho and para to the valence bonds; both of said residua are valently bonded to the ether oxygens through aromatic carbon atoms. Such aromatic polyethers are included within the class of polyarylene polyether resins described in U.S. Pat. No. 3,264,536, the disclosure of which is hereby incorporated herein by reference, for the purpose of describing and exemplifying E and E' in more detail. It is preferred that the dihydric phenol be a weakly acidic dinuclear phenol such as, for example, the dihydroxy diphenyl alkanes or the nuclear halogenated derivatives thereof, such as, for example, the 2,2-bis(4-hydroxyphenyl)propane, 1,1-bis(4-hydroxyphenyl)2-phenyl ethane bis(4-hydroxyphenyl)methane, or their chlorinated derivatives containing one or two chlorines on each aromatic ring. While these halogenated bisphenolic alkanes are more acidic than the non-halogenated bisphenols and hence slower in reacting in this process, they do impart valuable flame resistance to these polymers. Other materials also termed appropriately "bisphenols" are also highly valuable and preferred. These materials are the bisphenols of a symmetrical or unsymmetrical joining group, as, for example, other oxygen (—O—), carbonyl

sulfide (—S—), sulfone

or hydrocarbon residue in which the two phenolic nuclei are joined to the same or different carbon atoms of the residue.

Such dinuclear phenols can be characterized as having the structure:

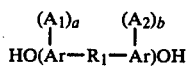
HO(Ar—R₁—Ar)OH wherein Ar is an aromatic group and preferably is a phenylene group, A₁ and A₂ can be the same or different inert substituent groups as alkyl groups having from 1 to 4 carbon atoms, halogen atoms, i.e. fluorine, chlorine, bromine or iodine, or alkoxy radicals having from 1 to 4 carbon atoms, a and b are integers having a value from 0 to 4, inclusive, and R₁ is representative of a bond between aromatic carbon atoms as in dihydroxy-diphenyl, or is a divalent radical, including for example, radicals such as

—O—, —S—, —SO—, —S—S—, —SO₂—, and divalent hydrocarbon radicals such as alkylene, alkylidene, cycloalkylene, cycloalkylidene, or the halogen, alkyl, aryl or like substituted alkylene, alkylidene and cycloaliphatic radicals as well as aromatic radicals and rings fused to both Ar groups.

Examples of specific dihydric polynuclear phenols include among others: the bis-(hydroxylphenyl)alkanes such as 2,2-bis-(4-hydroxyphenyl)propane, 2,4'-dihydroxydiphenylmethane, bis-(2-hydroxyphenyl)methane, bis-(4-hydroxyphenyl)methane, bis(4-hydroxy-2,6-dimethyl-3-methoxyphenyl)methane, 1,1-bis-(4-hydroxyphenyl)ethane, 1,2-bis-(4-hydroxyphenyl)ethane, 1,1-bis-(4-hydroxy-2-chlorophenyl)ethane, 1,1-bis-(4-hydroxyphenyl)propane, 1,3-bis-(3-methyl-4-hydroxyphenyl)propane, 2,2-bis(3-phenyl-4-hydroxyphenyl) propane, 2,2-bis-(3-isopropyl-4-hydroxyphenyl)propane, 2,2-bis-(2-isopropyl-4-hydroxyphenyl)propane, 2,2-bis-(4-hydroxynaphthyl)-propane, 2,2-bis-(4-hydroxyphenyl)pentane, 3,3-bis-(4-hydroxyphenyl)pentane 2,2-bis-(4-hydroxyphenyl) heptane, bis-(4-hydroxyphenyl)phenylmethane, 2,2-bis-(4-hydroxyphenyl)-1-phenyl-propane, 2,2-bis-(4-hydroxyphenyl)1,1,1,3,3,3,-hexafluoropropane and the like;

di(hydroxyphenyl)sulfones such as bis-(4-hydroxyphenyl, sulfone, 2,4'-dihydroxydiphenyl sulfone, 5-chloro2,4'-dihydroxydiphenyl sulfone, 5'-chloro-4,4'-dihydroxydiphenyl sulfone, and the like.

di(hydroxyphenyl)ethers such as bis-(4-hydroxyphenyl)ether, the 4,3'-, 4,2'-2,2'- 2,3'-, dihydroxydiphenyl ethers, 4,4'-dihydroxy-2,6-dimethyldiphenyl ether, bis-(4-hydroxy-3-isobutylphenyl) ether, bis-(4-hydroxy-3-isopropylphenyl) ether, bis-(4-hydroxy-3-chlorophenyl) ether, bis-(4-hydroxy-3-fluophenyl) ether, bis-(4-hydroxy-3-bromophenyl) ether, bis-(4-hydroxynaphthyl) ether, bis-(4-hydroxy-3-chloronaphthyl) ether, 4,4'-dihydroxy-3,6-dimethoxydiphenyl ether.

As herein used the E term defined as being the "residuum of the dihydric phenol" of course refers to the residue of the dihydric phenol after the removal of the two aromatic hydroxyl groups. Thus as is readily seen these polyarylene polyethers contain recurring groups of the residuum of the dihydric phenol and the residuum of the benzenoid compound bonded through aromatic ether oxygen atoms.

Any dihalobenzenoid or dinitrobenzenoid compound or mixtures thereof can be employed in this invention which compound or compounds has the two halogens or nitro-groups bonded to benzene rings having an electron withdrawing group in at least one of the positions ortho and para to the halogen or nitro-group. The dihalobenzenoid or dinitrobenzenoid compound can be either mononuclear where the halogens or nitro-groups are attached to the same benzenoid ring or polynuclear where they are attached to different benzenoid rings, as long as there is an activating electron withdrawing group in the ortho or para position of that benzenoid nucleus. Fluorine and chlorine substituted benzenoid reactants are preferred; the fluorine compounds for fast reactivity and the chlorine compounds for their inexpensiveness. Fluorine substituted benzenoid compounds are most preferred, particularly when there is a trace of water present in the polymerization reaction system. However, this water content should be maintained below about 1% and preferably below 0.5% for best results.

Any electron withdrawing group can be employed as the activator group in these compounds. It should be, of course, inert under the reaction conditions, but otherwise its structure is not critical. Preferred are the strong activating groups such as the sulfone group

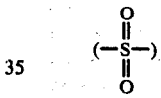

bonding two halogen or nitro substituted benzenoid nuclei as in the 4,4'-dichlorodiphenyl sulfone and 4,4'-difluorodiphenyl sulfone, although such other strong withdrawing groups hereinafter mentioned can also be used with equal ease.

The more powerful of the electron withdrawing groups give the fastest reactions and hence are preferred. It is further preferred that the ring contain no electron supplying groups on the same benzenoid nucleus as the halogen or nitro group; however, the presence of other groups on the nucleus or in the residuum of the compound can be tolerated. Preferably, all of the substituents on the benzenoid nucleus are either hydrogen (zero electron withdrawing), or other groups having a positive sigma* value, as set forth in J. F. Bunnett in Chem. Rev. 49 273 (1951) and Quart. Rev., 12, 1 (1958). See also Taft, *Steric Effects in Organic Chemistry*, John Wiley & Sons (1956), chapter 13; *Chem. Rev.*, 53, 222; JACS, 74, 3120; and JACS, 75, 4231.

The activating groups can be basically either of two types:

(a) monovalent groups that activate one or more halogens or nitro-groups on the same ring such as another nitro or halo group, phenylsulfone, or alkylsulfone, cyano, trifluoromethyl, nitroso, and hetero nitrogen as in pyridine.

(b) divalent group which can activate displacement of halogens on two different rings, such as the sulfone group

the carbonyl group

the vinylene group

the sulfoxide group

the azo-group —N=N—; the saturated fluorocarbon groups —CF$_2$CF$_2$—; organic phosphine oxides

where R$_2$ is a hydrocarbon group, and the ethylidene group

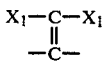

where X$_1$ can be hydrogen or halogen and activating groups within the nucleus which can activate halogens as nitro functions on the same ring such as in the case with difluorobenzoquinone, 1,4- or 1,5- or 1,8-difluoroanthraquinone, etc.

If desired, the polymers may be made with mixtures of two or more dihalobenzenoid or dinitrobenzenoid compounds. Thus, the E' residuum of the benzenoid compounds in the polymer structure may be the same or different.

It is seen also that as used herein, the E' term defined as being the "residuum of the benzenoid compound" refers to the aromatic or benzenoid residue of the compound after the removal of the halogen atom or nitro group on the benzenoid nucleus.

The polyarylene polyethers of this invention are prepared by methods well known in the art as for instance the substantially equimolar one-step reaction of a double alkali metal salt of dihydric phenol with a dihalobenzenoid compound in the presence of specific liquid organic sulfoxide or sulfone solvents under substantially anhydrous conditions. Catalyst are not necessary for this reaction but the unique facility of these solvents to promote the reaction to a high molecular weight product has now provided the critical tool necessary to secure sufficiently high molecular weight aromatic ether products useful for services heretofore limited to such products as polyformaldehydes and polycarbonates.

The polymers are also prepared in a two-step process in which a dihydric phenol is first converted in situ in the primary reaction solvent to the alkali metal salt by the reaction with the alkali metal, the alkali metal hydride, alkali metal hydroxide, alkali metal alkoxide or the alkali metal alkyl compounds. Preferably, the alkali metal hydroxide is employed. After removing the water which is present or formed, in order to secure substantially anhydrous conditions, the dialkali metal salts of dihydric phenol is admixed and reacted with about stoichiometric quantities of the dihalobenzenoid or dinitrobenzenoid compound.

The polymerization reaction proceeds in the liquid phase of a sulfoxide or sulfone organic solvent at elevated temperatures.

A preferred form of the polyarylene polyethers of this invention are those prepared using the dihydric polynuclear phenols of the following four types, including the derivatives thereof which are substituted with inert substituent groups

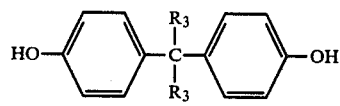

in which the R$_3$ group represents independently hydrogen, lower alkyl, lower aryl and the halogen substituted groups thereof, which can be the same or different;

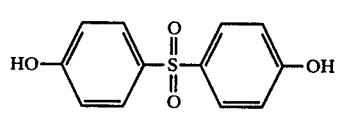

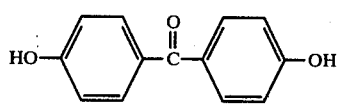

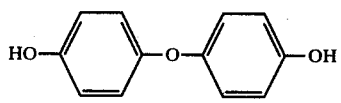

and substituted derivatives thereof.

It is also contemplated in this invention to use a mixture of two or more different dihydric phenols to accomplish the same ends as above. Thus when referred to above the —E— residuum in the polymer structure can actually be the same or different aromatic residua.

In order to secure the high polymers, the system should be substantially anhydrous, and preferably with less than 0.5 percent by weight water in the reaction mixtures.

The poly(aryl ether)s have a reduced viscosity of from about 0.4 to about 1.5 as measured in an appropriate solvent at an appropriate temperature depending on the particular polyether, such as in methylene chloride at 25° C.

The preferred poly(aryl ether)s have repeating units of the formula:

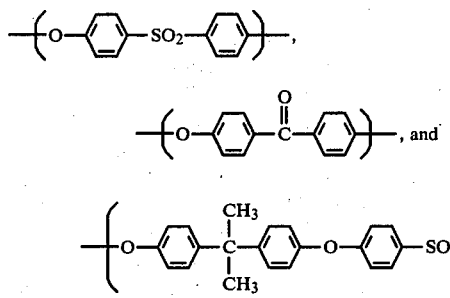

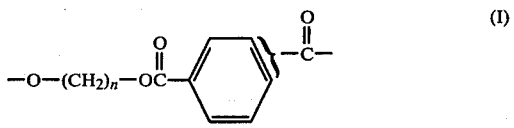

The polyesters which are suitable for use herein are derived from an aliphatic or cycloaliphatic diol, or mixtures thereof, containing from 2 to about 10 carbon atoms and at least one aromatic dicarboxylic acid. The polyesters which are derived from an aliphatic diol and an aromatic dicarboxylic acid have repeating units of the following general formula:

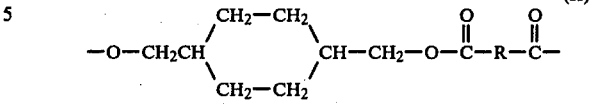

wherein n is an integer of from 2 to 4.

The preferred polyesters are poly(ethylene terephthalate) and poly(butylene terephthalate).

Also contemplated herein are the above polyesters with minor amounts, e.g., from 0.5 to about 2 percent by weight, of units derived from aliphatic acids and/or aliphatic polyols, to form copolyesters. The aliphatic polyols include glycols such as poly(ethylene glycol). These can be made following the teachings of, for example, U.S. Pat. Nos. 2,465,319 and 3,047,539.

Among the units which can be present in the copolyesters are those derived from aliphatic dicarboxylic acids, e.g., of up to about 50 carbon atoms, including cycloaliphatic straight and branched chain acids, such as adipic acid, cyclohexanediacetic acid, dimerized $C_{16}$–$C_{18}$ unsaturated acids (which have 32 to 36 carbon atoms), trimerized acids, and the like. In addition, there can be minor amounts of units derived from aliphatic glycols and polyols, e.g., of up to about 50 carbon atoms preferably from 2 to about 20 carbon atoms and these include, among others, propylene glycol, glycerol, diethylene glycol, triethylene glycol and the like.

The polyesters which are derived from a cycloaliphatic diol and an aromatic dicarboxylic acid are prepared by condensing either the cis- or trans-isomer (or mixtures thereof) of, for example, 1,4-cyclohexanedimethanol with the aromatic dicarboxylic acid so as to produce a polyester having recurring units having the following formula:

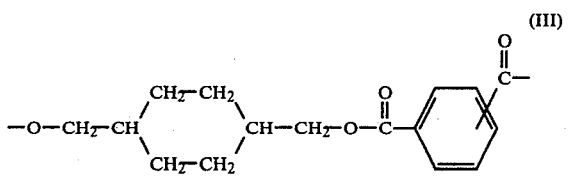

wherein the cyclohexane ring is selected from the cis- and trans-isomers thereof and R represents an aryl radical containing 6 to 20 carbon atoms and which is the decarboxylated residue derived from an aromatic dicarboxylic acid.

Examples of aromatic dicarboxylic acids indicated by R in formula II, include isophthalic or terephthalic acid, 1,2-di(p-carboxyphenyl) ethane, 4,4'-dicarboxydiphenyl ether, etc., and mixtures of these. All of these acids contain at least one aromatic nucleus. Fused rings can also be present such as in 1,4- or 1,5-naphthalene-dicarboxylic acids. The preferred dicarboxylic acid is terephthalic acid or mixtures of terephthalic and isophthalic acid.

A preferred polyester may be derived from the reaction of either the cis- or trans-isomer (or a mixture thereof) of 1,4-cyclohexanedimethanol with iso- or terephthalic acids or mixtures thereof. These polyesters have repeating units of the formula:

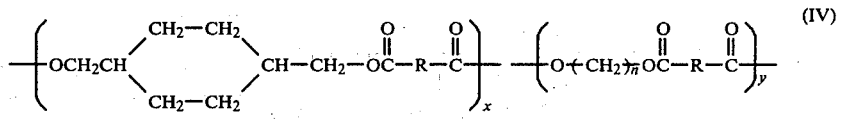

The preferred polyester would be based on terephthalic acid.

Another preferred polyester is a copolyester derived from a cyclohexane dimethanol, an alkylene glycol and an aromatic dicarboxylic acid. These copolyesters are prepared by condensing either the cis- or trans-isomer (or mixtures thereof) of, for example, 1,4-cyclohexanedimethanol and an alkylene glycol with an aromatic dicarboxylic acid so as to produce a copolyester having repeating units of the following formula:

$$-\left[OCH_2CH\begin{array}{c}CH_2-CH_2\\ \diagdown\\ \diagup\\ CH_2-CH_2\end{array}CH-CH_2-OC-R-C\right]_x-\left[O(CH_2)_nOC-R-C\right]_y \quad (IV)$$

wherein the cyclohexane ring is selected from the cis- and trans-isomers thereof, R is as previously defined, n is an integer of 2 to 4, the x units comprise from about 10 to about 90 percent by weight and the y units comprise from about 10 to about 90 percent by weight.

The preferred copolyester may be derived from the reaction of either the cis- or trans-isomer (or mixtures thereof), of 1,4-cyclohexanedimethanol and ethylene glycol with terephthalic acid in a molar ratio of 1:2:3. These copolyesters have repeating units of the following formula:

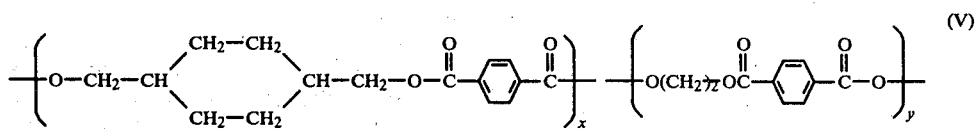

wherein x and y are as previously defined.

The polyesters used herein have an intrinsic viscosity of at least about 0.4 to about 2.0 dl/g. measured in a 60:40 phenol/tetrachloroethane mixture or similar solvent at 23°–60° C.

The thermoplastic aromatic polycarbonates that can be employed herein are homopolymers and copolymers and mixtures thereof which have an intrinsic viscosity of 0.40 to 1.0 dl./g. as measured in methylene chloride at 25° C. that are prepared by reacting a dihydric phenol with a carbonate precursor. Typical of some of the dihydric phenols that may be employed in the practice of this invention are bisphenol-A (2,2-bis(4-hydroxyphenyl) propane), bis(4-hydroxyphenyl) methane, 2,2-bis(4-hydroxy-3-methylphenyl) propane, 4,4-bis(4-hydroxyphenyl) heptane, 2,2-(3,5,3',5'-tetrachloro-4,4'-dihydroxydiphenyl) propane, 2,2-(3,5,3',5'-tetrabromo-4,4'-dihydroxydiphenyl)-propane, (3,3'-dichloro-4,4'-dihydroxydiphenyl) methane. Other dihydric phenols of the bisphenol type are also available and are disclosed in U.S. Pat. Nos. 2,999,835, 3,028,365 and 3,334,154.

It is, of course, possible to employ two or more different dihydric phenols or a copolymer of a dihydric phenol with a glycol or with hydroxy or acid terminated polyester, or with a dibasic acid in the event a carbonate copolymer or inter-polymer rather than a homopolymer is desired for use in the preparation of the aromatic carbonate polymers of this invention.

The carbonate precursor may be either a carbonyl halide, a carbonate ester or a haloformate. The carbonyl halides which can be employed herein are carbonyl bromide, carbonyl chloride and mixtures thereof. Typical of the carbonate esters which may be employed herein are diphenyl carbonate, di-(halophenyl) carbonates such as di-(chlorophenyl) carbonate, di-(bromophenyl) carbonate, di-(trichlorophenyl) carbonate, di-(tribromophenyl) carbonate, etc., di-(alkylphenyl) carbonates such as di(tolyl) carbonate, etc., di-(naphthyl) carbonate, di-(chloronaphthyl) carbonate, phenyl tolyl carbonate, chlorophenyl chloronaphthyl carbonate, etc. or mixtures thereof. The haloformates suitable for use herein include bis-haloformates of dihydric phenols (for example, bischloroformates of bisphenol-A, of hydroquinone, etc.) or glycols (for example, bishaloformates of ethylene glycol, neopentyl glycol, polyethylene glycol, etc.). While other carbonate precursors will occur to those skilled in the art, carbonyl chloride, also known as phosgene, is preferred.

The aromatic carbonate polymers of this invention may be prepared by using phosgene or a haloformate and by employing a molecular weight regulator, an acid acceptor and a catalyst. The molecular weight regulators which can be employed in carrying out the process of this invention include monohydric phenols such as phenol, para-tertiarybutylphenol, para-bromophenol, primary and secondary amines, etc. Preferably, a phenol is employed as the molecular weight regulator.

A suitable acid acceptor may be either an organic or an inorganic acid acceptor. A suitable organic acid acceptor is a tertiary amine and includes such materials as pyridine, triethylamine, dimethylaniline, tributylamine, etc. The inorganic acid acceptor may be one which can be either a hydroxide, a carbonate, a bicarbonate, or a phosphate of an alkali or alkaline earth metal.

The catalysts which are employed herein can be any of the suitable catalysts that aid the polymerization of bisphenol-A with phosgene. Suitable catalysts include tertiary amines such as, for example, triethylamine, tripropylamine, N,N-dimethylaniline, quaternary ammonium compounds such as, for example, tetraethylammonium bromide, cetyl triethyl ammonium bromide, tetra-n-heptylammonium iodide, tetra-n-propyl ammonium bromide, tetra-methylammonium chloride, tetramethyl ammonium hydroxide, tetra-n-butyl ammonium iodide, benzyltrimethyl ammonium chloride and quaternary phosphonium compounds such as, for example, n-butyltriphenyl phosphonium bromide and methyltriphenyl phosphonium bromide.

The polycarbonates can be prepared in a one-phase (homogeneous solution) or two-phase (interfacial) systems when phosgene or a haloformate are used. Bulk reactions are possible with the diarylcarbonate precursors. The preferred polycarbonate is a biphenol-A polycarbonate.

The poly(aryl ether) is used in amounts of from about 20 to about 90, preferably from about 40 to about 80 weight percent. The polyester is used in amounts of from about 10 to about 60, preferably from about 10 to about 45 weight percent. The polycarbonate is used in compatibilizing amounts of from about 1 to about 25, preferably from about 3 to about 20 weight percent.

The impact modifiers which can be used in this invention are described in U.S. Patent Application Ser. No. 049,131 of L. M. Robeson, titled "Impact Modified Polyarylate Blends", filed June 18, 1979. These impact modifiers are a graft copolymer of a vinyl aromatic, an acrylate, an unsaturated nitrile, or mixtures thereof, grafted onto an unsaturated elastomeric backbone and having a tensile modulus (as measured by ASTM D-638, except that the test piece is compression molded to a 20 mil thickness) of less than about 100,000 psi, and preferably from about 15,000 to less than about 100,000 psi.

The unsaturated elastomeric backbone may be polybutadiene, poly(butadiene-co-styrene), poly(butadiene-co-acrylonitrile), or poly(isoprene). In each of the polymers there is sufficient butadiene to give the polymer a rubbery character.

Additionally impact modifiers based on acrylic elastomers may be used. Preferably, acrylic elastomers based on n-butyl acrylate may be used.

The constituents which are grafted onto the unsaturated elastomeric backbone are selected from a vinyl aromatic, such as styrene, α-methylstyrene, alkylstyrene, or mixtures thereof; an acrylate such as the acrylic ester monomers, such as methyl acrylate, ethyl acrylate, butyl acrylate, methyl methacrylate, or mixtures thereof; an unsaturated nitrile such as acrylonitrile, methacrylonitrile, or mixtures thereof. It will be understood that the vinyl aromatic, acrylate and acrylonitrile may be used individually or in any combinations in grafting onto the unsaturated elastomeric backbone.

These impact modifiers are free-flowing powders and are commercially available as impact modifiers for poly(vinyl chloride) as described in, for example, V. Shakaypal, in "Developments in PVC Technology", edited by J. H. L. Hensen and A. Whelan, Applied Science Publishers Ltd., New York, 1973.

The grafted constituents of the impact modifier will comprise from about 20 to about 60 percent by weight of said constituents such that their tensile modulus does not exceed about 100,000 psi, and is preferably, between about 15,000 to less than about 100,000 psi.

The impact modifier is utilized in amounts of from 0 to about 30 weight percent, preferably from about 3 to about 15 weight percent.

The fiber reinforcement in this composition includes fiberglass, carbon fibers, and the like, and mixtures thereof. The particulate inorganic fillers which may be used include wollastonite, calcium carbonate, glass beads, and the like, or mixtures thereof. Mixtures of fiber reinforcement and particulate fillers may also be used.

The fiber reinforcement, filler or combinations thereof is utilized in amounts of from 0 to about 50 weight percent, preferably from about 15 to about 30 weight percent.

The composition of this invention may also include a flame retardant additive such as an organic halogen containing compound particularly, decabromodiphenyl ether or a triarylphosphate such as triphenylphosphate, or combinations thereof.

The flame retardant additive is utilized in amounts of from 0 to about 15 weight percent, preferably from about 2 to about 10 weight percent.

It should, of course, be obvious to those skilled in the art that other additives may be included in the present compositions. These additives include plasticizers; pigments; thermal stabilizers; ultraviolet light stabilizers, processing aids, and the like.

The compositions of this invention are prepared by any conventional mixing methods. For example, a preferred method comprises mixing the poly(aryl ether), polyester, and polycarbonate, and other optional ingredients in powder or granular form in an extruder and extruding the mixture into strands, chopping the strands into pellets and molding the pellets into the desired article.

EXAMPLES

The following Examples serve to give specific illustrations of the practice of this invention but they are not intended in any way to limit the scope of this invention.

Control A

A blend of 50 weight percent of a polysulfone of the following formula

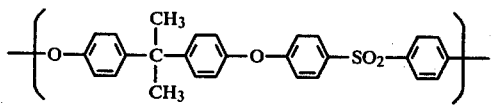

having a reduced viscosity of 0.49 as measured in chloroform (0.2 gram polymer in 100 ml at 25° C.) and 50 weight percent of a poly(butylene terephthalate) resin (6PRO sold by Tennessee Eastman Company) having a reduced viscosity of 1.83 as measured in 60/40 phenol/tetrachloroethane (0.2 g/100 ml) at 25° C., was prepared by extrusion blending in a single screw 1-inch diameter extruder with L/D=36/1. The extrudate was chopped into pellets. The pelletized product was then injection molded into ASTM test bars (at 270°–300° C.) using a Newbury 1¼ ounce screw injection molding machine. The test bars were measured for the following properties: tensile strength and modulus according to ASTM D-638; elongation at break according to ASTM D-638; notched izod impact strength according to ASTM D-256; tensile impact strength according to ASTM D-1822.

The results are shown in Table I.

EXAMPLE 1

The procedure of Control A was exactly repeated except that 34 weight percent of the polysulfone described in Control A was blended with 50 weight percent of the poly(butylene terephthalate) described in Control A and 15 weight percent of a polycarbonate (Lexan 101 sold by General Electric Company) having a reduced viscosity of 0.64 as measured in chloroform at 25° C.

The results are shown in Table I.

CONTROL B

The procedure of Control A was exactly repeated except that 60 weight percent of the polysulfone described in Control A was blended with 40 weight percent of the poly(butylene terephthalate) [6 PRO] described in Control A.

The results are shown in Table I.

EXAMPLE 2

The procedure of Control A was exactly repeated except that 45 weight percent of the polysulfone described in Control A was blended with 40 weight percent of the poly(butylene terephthalate) [6PRO] described in Control A and 15 weight percent of the polycarbonate (Lexan 101) described in Example 1.

The results are shown in Table I.

CONTROL C

The procedure of Control A was exactly repeated except that 55 weight percent of the polysulfone described in Control A was blended with 35 weight percent of the poly(butylene terephthalate) [6PRO] described in Control A and 10 weight percent of an impact modifier KM-611 (a styrene/acrylate/butadiene terpolymer having a tensile modulus of 43,600 psi and sold by Rohm and Haas Company).

The results are shown in Table I.

EXAMPLE 3

The procedure of Control A was exactly repeated except that 48.6 weight percent of the polysulfone described in Control A was blended with 36 weight percent of the poly(butylene terephthalate) [6PRO], described in Control A, 10 weight percent of impact modifier [KM-611] described in Control C and 5.4 weight percent of the polycarbonate (Lexan 101) described in Example 1.

The results are shown in Table I.

The data in the Table shows that the addition of aromatic polycarbonate to the incompatible polysulfone poly(butylene terephthalate) mixtures improves the compatibility.

When 15 weight percent of the polysulfone of Control A is replaced by 15 weight percent of polycarbonate (Example 1) to give the composition of this invention, elongation and notched izod impact strength are increased. When 15 weight percent of the polysulfone of Control B is replaced by 15 weight percent of polycarbonate (Example 2) to give a composition of this invention, notched izod impact strength and tensile impact strength are increased and elongation is surprisingly increased from 23 to 132 percent.

Also, the data in the Table shows that the addition of an aromatic polycarbonate (Example 3) to the polysulfone-poly(butylene terephthalate) mixtures containing impact modifier (Control C) results in a surprising increase in the notched izod impact strength, i.e., from 1.2 to 14.1 ft.-lbs./in. of notch.

The test specimens were measured for the following properties: tensile strength and modulus according to ASTM D-638; elongation at break according to ASTM D-638; notched izod impact strength according to ASTM D-256; tensile impact strength according to ASTM D-1822; heat distortion temperature measured at 264 psi on a ⅛ inch thick unannealed test bar according to ASTM D-635.

The results are shown in Table II.

CONTROL E

The procedure of Control D was exactly repeated except that the ingredients of Control D were used in the following amounts: 42.8 weight percent polysulfone, 31.2 weight percent poly(ethylene terephthalate) [Cleartuf 1002A], 4 weight percent decabromodiphenyl

TABLE I

| Example | Description of the Composition[1] Polymer | (wt. %) | Tensile Modulus (psi) | Tensile Strength (psi) | Elongation (percent) | Notched Izod Impact Strength (ft.-lbs./in. of Notch) | Tensile Impact Strength (ft.-lbs./in.[2]) |
|---|---|---|---|---|---|---|---|
| Control A | PS | 50 | 374,000 | 7,030 | 2.1 | 0.33 | 25 |
| | PBT | 50 | | | | | |
| 1 | PS | 35 | 362,000 | 7,520 | 2.3 | 0.72 | 15 |
| | PBT | 50 | | | | | |
| | PC | 15 | | | | | |
| Control B | PS | 60 | 361,000 | 9,590 | 23 | 0.76 | 65 |
| | PBT | 40 | | | | | |
| 2 | PS | 45 | 334,000 | 8,330 | 132 | 1.15 | 117 |
| | PBT | 40 | | | | | |
| | PC | 15 | | | | | |
| Control C | PS | 55 | 314,000 | 7,400 | 23 | 1.2 | 54 |
| | PBT | 35 | | | | | |
| | KM-611 | 10 | | | | | |
| 3 | PS | 48.6 | 318,000 | 7,790 | 92 | 14.1 | 108 |
| | PBT | 36 | | | | | |
| | KM-611 | 5.4 | | | | | |
| | PC | 10 | | | | | |

[1]PS = polysulfone
PBT = poly(butylene terephthalate)
PC = polycarbonate

CONTROL D

A blend of 51.8 weight percent of a polysulfone formed from bisphenol-A and 4,4'-dichlorodiphenyl sulfone with a reduced viscosity of 0.43 (measured in chloroform 0.2 g/100 ml at 25° C.), 22.2 weight percent of a poly(ethylene terephthalate) resin (Cleartuf 1002A sold by Goodyear Tire & Rubber Co.) with a reduced viscosity of 1.96 (measured in 60/40 phenol/tetrachloroethane 0.2 g/100 ml at 25° C.), 4 weight percent decabromodiphenyl oxide, and 22 weight percent fiberglass (⅛ inch chopped strand P1978—X1 sold by Owens-Corning Fiberglass Co.) was prepared by extrusion blending the components at about 270° C. in a single screw 1-inch diameter extruder with L/D=36/1. The extrudate was chopped into pellets. The pelletized product was then injection molded into ASTM test specimens (at 270°-300° C.) using a Newbury 1¼ ounce screw injection molding machine.

oxide and 22 weight percent fiberglass.

The results are shown in Table II.

EXAMPLES 4 TO 10

The procedure of Control D was exactly repeated except that a polycarbonate (Lexan 101 as described in Example 1) was added, in amounts shown in Table II, to the ingredients of Control D which were used in the amounts shown in Table II.

The results are shown in Table II.

The data in the Table shows that the addition of small amounts i.e., from 5 to 20 weight percent of an aromatic polycarbonate (Examples 4 to 10) to a mixture of polysulfone, poly(ethylene terephthalate), fiberglass and decabromodiphenyl oxide (Controls A and B), results in improved elongation at break, notched izod impact strength, and tensile impact strength. This demonstrates the compatibilizing effect the polycarbonate has on the mixture of polysulfone, poly(ethylene terephthalate), fiberglass and decabromodiphenyl oxide.

TABLE II

| Example | Control D | Control E | 4 | 5 | 6 | 7 | 8 | 9 | 10 |
|---|---|---|---|---|---|---|---|---|---|
| Components[1] (wt. %) | | | | | | | | | |
| PS | 51.8 | 42.8 | 42.8 | 42.8 | 40.3 | 38.3 | 38.3 | 37.8 | 32 |
| PET | 22.2 | 31.2 | 26.2 | 22 | 26.2 | 26.2 | 24.2 | 26.2 | 22 |
| DBDPO | 4 | 4 | 4 | 4 | 4 | 6 | 8 | 4 | 4 |
| fiberglass | 22 | 22 | 22 | 22 | 22 | 22 | 22 | 22 | 22 |
| PC | — | — | 5 | 10 | 7.5 | 7.5 | 7.5 | 10 | 20 |
| Tensile modulus (psi) | 980,000 | 1,090,000 | 989,000 | 973,000 | 946,000 | 1,020,000 | 1,010,000 | 989,000 | 947,000 |
| Tensile strength (psi) | 15,300 | 17,400 | 17,500 | 17,300 | 17,000 | 17,800 | 18,000 | 17,200 | 17,300 |

TABLE II-continued

| Example | Control D | Control E | 4 | 5 | 6 | 7 | 8 | 9 | 10 |
| --- | --- | --- | --- | --- | --- | --- | --- | --- | --- |
| Elongation (%) | 2.0 | 2.3 | 2.6 | 2.6 | 2.9 | 2.9 | 2.8 | 2.6 | 2.8 |
| Notched Izod Impact Strength (ft.-lbs./in. of Notch) | 1.4 | 1.5 | 2.0 | 2.0 | 1.8 | 1.7 | 1.7 | 2.0 | 2.1 |
| Tensile Impact Strength (ft.-lbs./in.$^2$) | 36 | 24 | 83 | 75 | 68 | 49 | 63 | 83 | 90 |
| Heat Distortion Temp. (°C.) | 165 | 119 | 162 | 155 | 136 | 126 | 136 | 151 | 149 |

[1]PS = polysulfone
PET = poly(ethylene terephthalate)
DBDPO = decabromodiphenyl oxide
PC = polycarbonate The following Examples describe compositions of the instant invention utilizing commercially available polyester or polycarbonate resins.

EXAMPLE 11

The procedure of Control D was exactly repeated except that 40.3 weight percent of the polysulfone of Control A was blended with 7.5 weight percent of polycarbonate (Merlon 40F sold by Mobay Corporation), with a reduced viscosity of 0.52 (measured in methylene chloride 0.2 g/100 ml at 25° C.), 26.2 weight percent of the poly(ethylene terephthalate) (Cleartuf 1002A) of Control D, 4.0 weight percent of decabromodiphenyl oxide and 22 weight percent of fiberglass.

The results are shown in Table III.

EXAMPLE 12

The procedure of Control D was exactly repeated except that 40.3 weight percent of the polysulfone of Control A was blended with 7.5 weight percent of the polycarbonate of Example 1 (Lexan 101), 26.2 weight percent of poly(ethylene terephthalate) Vituf 1001A sold by Goodyear Tire & Rubber Company with a melt flow of 22.8 dg/min. at 27° C. (44 psig), 4.0 weight percent of decabromodiphenyl oxide and 22 weight percent of fiberglass.

The results are shown in II.

EXAMPLE 13

The procedure of Control D was exactly repeated except that 40.3 weight percent of the polysulfone of Control A was blended with 7.5 weight percent of the polycarbonate of Example I (Lexan 101), 26.2 weight percent of poly(ethylene terephthalate) (Cleartuf 72 sold by Goodyear Tire & Rubber Co.) having an intrinsic viscosity of 0.72 dl/g as measured in phenol/tetrachloroethane (60/40) at 25° C., 4.0 weight percent of decabromodiphenyl oxide and 22 weight percent fiberglass.

The results are shown in Table III.

EXAMPLE 14

The procedure of Control D was exactly repeated except that 40.3 weight percent of the polysulfone of Control A was blended with 7.5 weight percent of the polycarbonate of Example 1 (Lexan 101), 26.2 weight percent of poly(ethylene terephthalate) Petpac sold by Celanese Corporation, having an intrinsic viscosity of 0.74 dl/g as measured in phenol/tetrachloroethane (60/40) at 25° C., 4.0 weight percent of decabromodiphenyl oxide and 22 weight percent fiberglass.

The results are shown in Table III.

EXAMPLE 15

The procedure of Control D was exactly repeated except that 40.3 weight percent of the polysulfone of Control A was blended with 7.5 weight percent of the polycarbonate of Example 1 (Lexan 101), 26.2 weight percent of poly(ethylene terephthalate) Tenite 7970 sold by Tennessee Eastman Co., having an intrinsic viscosity of 0.70 dl/g (as measured in phenol/tetrachloroethane (60/40) at 25° C.), 4.0 weight percent decabromodiphenyl oxide and 22 weight percent fiberglass.

TABLE III

| Example | Control D | Control E | 11 | 12 | 13 | 14 | 15 |
| --- | --- | --- | --- | --- | --- | --- | --- |
| Components[1] (wt. %) | | | | | | | |
| PS | 51.8 | 42.8 | 40.3 | 40.3 | 40.3 | 40.3 | 40.3 |
| PET | 22.2 | 31.2 | 26.2 | 26.2 | 26.2 | 26.2 | 26.2 |
| DBDPO | 4 | 4 | 4 | 4 | 4 | 4 | 4 |
| Fiberglass | 22 | 22 | 22 | 22 | 22 | 22 | 22 |
| PC | — | — | 7.5 | 7.5 | 7.5 | 7.5 | 7.5 |
| Tensile modulus (psi) | 980,000 | 1,090,000 | 999,000 | 1,010,000 | 975,000 | 1,010,000 | 979,000 |
| Tensile strength (psi) | 15,300 | 17,400 | 17,600 | 17,400 | 17,600 | 17,900 | 17,600 |
| Elongation (%) | 2.0 | 2.3 | 2.9 | 2.8 | 2.7 | 2.6 | 2.6 |
| Notched Izod Impact Strength (ft.-lbs./in. of Notch) | 1.4 | 1.5 | 1.8 | 1.8 | 1.8 | 1.8 | 1.6 |
| Tensile Impact Strength (ft.-lbs./in.$^2$) | 36 | 24 | 42 | 61 | 76 | 65 | 57 |
| Heat Distortion (°C.) Temp. | 165 | 119 | 136 | 142 | 141 | 144 | 154 |

[1]PS = polysulfone
PET = poly(ethylene terephthalate)
DBDPO = decabromodiphenyl oxide
PC = polycarbonate

EXAMPLE 16

The following blend of Example 6: 40.3 weight percent polysulfone, 26.2 weight percent poly(ethylene terephthalate), 4 weight percent decabromodiphenyl oxide, 22 weight percent glass, and 7.5 weight percent polycarbonate (prepared as in Example 6) was injection molded using an 8 ounce HPM injection molding machine into rectangular plaques 4×9×0.125 inches. The plaques were measured for maximum deviation from flatness along the nine inch side with a dial micrometer. The percent warpage was determined by the following formula:

$$\text{Percent warpage} = \frac{\text{Maximum deviation}}{\text{thickness (0.125 inches)}} \times 100.$$

The part warpage was determined by the following formula:

$$\text{Part warpage} = \frac{\text{Percent warpage}}{\text{length of part (9 inches)}}$$

For comparison, two commercially available fiberglass reinforced, flame retardant poly(butylene terephthalate) resins (Valox 420 SEO contains about 30 weight percent fiberglass and is sold by General Electric Company and Gafite X-4612R sold by GAF Corporation) were also molded into plaques and tested for percent warpage and part warpage as described, supra. The results are shown in Table IV.

TABLE IV

| Composition | Warpage (%) | Part Warpage (%/inch) |
|---|---|---|
| Example 6 | 38 | 4.2 |
| Valox | 67 | 7.4 |
| Gafite | 273 | 30.3 |

EXAMPLE 17

The following blend of Example 6:40:3 weight percent polysulfone, 26.2 weight percent poly(ethylene terephthalate), 4 weight percent decabromodiphenyl oxide, 22 weight percent glass, and 7.5 weight percent polycarbonate (prepared as in Example 6) was injection molded into ASTM test specimens (at 270°–300° C.) using a Newbury ¼ ounce screw injection molding machine.

The test specimens were subjected to the following tests: dielectric strength (volts/millimeter) according to ASTM D-149-64; volume resistivity (ohm-centimeters) and volume resistivity after being maintained for 96 hours at a relative humidity of 90 percent at 35° C., according to ASTM D-257-61; surface resistivity (ohm-centimeters) and surface resistivity after being maintained for 96 hours at a relative humidity of 90 percent at 35° C., according to ASTM D-257-61; dielectric constant, measured at 60 hertz (cycles per second) a kilohertz and a megahertz, and dissipation factor measured at 60 hertz, a kilohertz and a megahertz, according to ASTM D-150-65T.

The results are shown in Table V.

The data in the Table show that the compositions of this invention have good electrical properties.

TABLE V

| Dielectric strength (volts/mil) | 488 |
|---|---|
| Volume resistivity (ohm-cm) | 10^15 |
| Volume resistivity after 96 hrs. at 35° C. and 90% relative humidity (ohm-cm) | 10^14 |
| Surface resistivity (ohm-cm) | 10^15 |
| Surface resistivity after 96 hrs. at 35° C. and 90% relative humidity (ohm-cm) | 10^14 |
| Dielectric constant at | |
| 60 hertz | 3.7 |
| 1 kilohertz | 3.7 |
| 1 megahertz | 3.7 |
| Dissipation factor at | |

TABLE V-continued

| 60 hertz | 0.002 |
|---|---|
| 1 kilohertz | 0.003 |
| 1 megahertz | 0.010 |

What is claimed is:
1. A molding composition comprising:
(a) from about 20 to about 90 weight percent of a poly(aryl ether) having recurring units of the formula:

O—E—O—E'— wherein E is the residuum of a dihydric phenol and E' is the residuum of a benzenoid compound having an inert electron withdrawing group in at least one of the positions ortho and para to the valence bonds wherein both of said residuum are valently bonded to the ether oxygens through aromatic carbon atoms,
(b) from about 10 to about 60 weight percent of a polyester, and
(c) from about 1 to about 25 weight percent of an aromatic polycarbonate.
2. A molding composition comprising:
(a) from about 20 to about 90 weight percent of a poly(aryl ether) having recurring units of the formula:

O—E—O—E'— wherein E is the residuum of a dihydric phenol and E' is the residuum of a benzenoid compound having an inert electron withdrawing group in at least one of the positions ortho and para to the valence bonds wherein both of said residuum are valently bonded to the ether oxygens through aromatic carbon atoms,
(b) from about 10 to about 60 weight percent of a polyester,
(c) from about 1 to about 25 weight percent of an aromatic polycarbonate, and
(d) from about 15 to about 30 weight percent of a fiber reinforcement.
3. A molding composition comprising a poly(aryl ether), a polyester, a compatibilizing amount of an aromatic polycarbonate and an impact modifier which is a graft copolymer of a vinyl aromatic, an acrylate, an unsaturated nitrile or mixtures thereof, grafted onto an unsaturated elastomeric backbone and having a tensile modulus of less than about 10,000 psi.
4. A molding composition comprising:
(a) a poly(aryl ether) having recurring units of the formula

O—E—O—E'— wherein E is the residuum of a dihydric phenol and E' is the residuum of a benzenoid compound having an inert electron withdrawing group in at least one of the positions ortho and para to the valence bonds wherein both of said residium are valently bonded to the ether oxygens through aromatic carbon atoms,
(b) a polyester, and
(c) a compatibilizing amount of an aromatic polycarbonate.

5. A molding composition as defined in claim 4 wherein the poly(aryl ether) has repeating units of the formula:

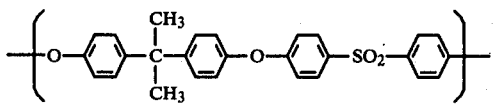

6. A molding composition as defined in claim 4 wherein the poly(aryl ether) has repeating units of the formula:

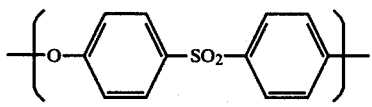

7. A molding composition as defined in claim 4 wherein the poly(aryl ether) has repeating units of the formula:

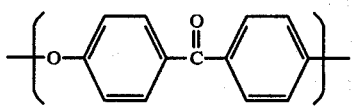

8. A molding composition as defined in claim 4 wherein the polyester has repeating units of the general formula:

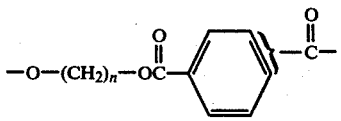

wherein n is an integer of from 2 to 4.

9. A molding composition as defined in claim 8 wherein the polyester is poly(ethylene terephthalate).

10. A molding composition as defined in claim 8 wherein the polyester is poly(butylene terephthalate).

11. A molding composition as defined in claim 4 wherein the polycarbonate is prepared from the reaction product of a dihydric phenol and a carbonate precursor.

12. A molding composition as defined in claim 11 wherein the dihydric phenol is bisphenol-A and the carbonate precursor is carbonyl chloride.

13. A molding composition as in claim 4 wherein the poly(aryl ether) is used in amounts of from about 20 to about 90 weight percent.

14. A molding composition as in claim 4 wherein the polyester is used in amounts of from about 10 to about 60 weight percent.

15. A molding composition as in claim 4 wherein the polycarbonate is used in amounts of from about 1 to about 25 weight percent.

16. A molding composition as in claim 4 which contains an impact modifier which is a graft copolymer of a vinyl aromatic, an acrylate, an unsaturated nitrile, or mixtures thereof, grafted onto an unsaturated elastomeric backbone and having a tensile modulus of less than about 100,000 psi.

17. A molding composition as in claim 16 which contains an impact modifier which is a graft copolymer of a vinyl aromatic, an acrylate, an unsaturated nitrile, or mixtures thereof, grafted onto an acrylate elastomeric backbone and having a tensile modulus of less than about 100,000 psi.

18. A molding composition as in claim 4 which contains fiber reinforcement.

19. A molding composition as in claim 18 wherein the fiber reinforcement is fiberglass or carbon fibers.

20. A molding composition as in claim 4 which contains an inorganic particulate filler.

21. A molding composition as in claim 20 wherein the filler is wollastonite.

22. A molding composition as in claim 4 which contains fiber reinforcement and an inorganic particulate filler.

23. A molding composition as in claim 4 which contains a flame retardant additive.

24. A molding composition as in claim 23 wherein the flame retardant additive is decabromodiphenyl oxide.

25. A molding composition as in claim 1 which contains from about 3 to about 15 weight percent of an impact modifier which is a graft copolymer of a vinyl aromatic, an acrylate, an unsaturated nitrile, or mixtures thereof, grafted onto an unsaturated elastomeric backbone and having a tensile modulus of less than about 100,000 psi.

26. A molding composition as in claim 2 which contains from about 2 to about 10 weight percent of a flame retardant additive.

27. An article molded from the composition of claims 4, 1, 2, 3 or 25.

28. An electrical connector molded from the composition of claims 4, 1, 2, 3 or 25.

* * * * *